United States Patent Office 3,839,412
Patented Oct. 1, 1974

3,839,412
ISOPHTHALAMIDE INTERMEDIATES
James V. Duffy, Beltsville, Md., assignor to the United States of America as represented by the Secretary of the Navy
No Drawing. Original application July 11, 1973, Ser. No. 378,295, now Patent No. 3,804,807. Divided and this application Nov. 19, 1973, Ser. No. 416,911
Int. Cl. C07c *103/30*
U.S. Cl. 260—471 R                                      5 Claims

ABSTRACT OF THE DISCLOSURE

Film or fiber forming phenylated polyamide-quinoxalines consisting essentially of units of the formula (I)

where X is a direct bond, $-\overset{O}{\underset{\|}{C}}-$,

O, S, SO or $SO_2$ and Y is o-phenylene, m-phenylene, p-phenylene or $-\langle O \rangle-Z-\langle O \rangle-$ wherein Z is a direct bond, $-\overset{O}{\underset{\|}{C}}-$, O, S, SO or $SO_2$ and R is H, phenyl or lower alkyl are prepared by contacting a tetramine of the formula (II)

with an amide of the formula (III)

These polymers find use as films or coatings and can also be made into fibers.

---

This is a division of application Ser. No. 378,295 filed July 11, 1973, now Pat. No. 3,804,807.

BACKGROUND OF THE INVENTION

This invention relates to polymers and more particularly to polyquinoxaline polymers.

Polyquinoxalines, polyimide-quinoxalines and polyamide-quinoxalines have been disclosed in the prior art. More particularly polyamide-quinoxalines have been disclosed in application Ser. No. 308,383 now Pat. No. 3,746,687, filed Nov. 21, 1972 entitled "Phenylated Amide-Quinoxaline Copolymers" by James V. Duffy and Joseph M. Augl. The polyquinoxaline systems are of interest because they have excellent thermal and oxidative resistance in addition to their good solubility properties. These properties make the polyquinoxalines good coatings as well as excellent materials for use in forming fibers. Recently, however, it has been discovered that these linear polymers undergo thermoplastic deformation in the region of their glass transition temperatures. This thermoplasticity severely limits the usefulness of these polymers in areas where mechanical integrity at elevated temperatures is of primary concern.

Thus, a search has gone on for polyquinoxalines which do not have this thermoplasticity problem.

SUMMARY OF THE INVENTION

Accordingly, one object of this invention is to provide polyquinoxalines.

Another object of this invention is to provide polyamide-quinoxalines.

Yet another object of this invention is to provide polyamidequinoxalines which have good oxidative-thermal stability.

A further object of this invention is to provide polyamide-quinoxalines which are easy to process into final products.

A still further object of this invention is to provide polyamide-quinoxalines which are readily soluble in common organic solvents.

Yet another object of this invention is to provide polyamide-quinoxalines which can be used as high temperature protective coatings.

Still another object of this invention is to provide polyamide-quinoxalines which can be formed into fibers or films.

Yet a still further object of this invention is to provide polyamide-quinoxalines which do not undergo thermoplastic deformation in the region of their glass transition temperature.

These and other objects of this invention are accomplished by providing polyamide-quinoxalines of formula I which are formed by contacting a tetramine of formula II with the compound of formula III.

DESCRIPTION OF THE PREFERRED EMBODIMENT

The polymers of formula I are prepared by reacting the commercially available tetramines of formula II with a compound of formula III. The compounds of formula III are prepared by reacting (IV)

with (V)

to yield (VI)

which can then be reacted with the appropriate alcohol in a simple esterification reaction.

The polymers of this invention are prepared by solution condensation of the tetramine of formula II and the amides of formula III. The condensations proceeded well at about room temperature to yield the desired products. Additionally, the fact that such condensations can be carried out at about room temperature decreases the number of side reactions and hence increases the solubility of the final products.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE I

N,N'-bis(4-benzilyl)-5-carboxyisophthalamide

To a 1 liter 3 necked flask equipped with a stirrer, nitrogen inlet and condenser was added 13.3 g. (0.05 m.) of distilled 1,3,5-benzenetricarboxylic acid chloride and 22.5 g. (0.10 moles) of recrystallized 4-aminobenzil and 500 ml. of benzene. The benzene had been previously dried by distillation from sodium. The temperature of the reaction mixture was slowly raised to reflux and the liberated HCl was trapped by passing into a water bath which was titrated with standard NaOH. The reaction was 98.5% complete after 3 hours at reflux. The mixture was filtered hot and after solvent evaporation the dry solid was stirred in water overnight to cause hydrolysis of the remaining acid chloride. After filtering and drying the solid was dissolved in 2 liters of dioxane and 10 g. of diatomaceous earth was added to clear the solution. The hot mixture was filtered to give a clear light yellow solution. The product was recrystallized from ethanol to give 23 g. (74% yield) of product.

EXAMPLE 2

Polymerization 0.62458 g. (0.001 m.) of N,N'-bis(4-benzilyl)-5-carboxyisophthalamide and 0.2423 g. (0.001 m.) of 3,3',4,4'-benzophenone tetraamine were dissolved in a solvent mixture of 10 ml. of N-methylpyrrolidone and 1 ml. of m-cresol. The reaction mixture was stirred at room temperature under nitrogen for 65 hours. Strong flexible films were cast from solution which withstood repeated creasing.

EXAMPLE 3

N,N'-bis(4-benzilyl)-5-carboethoxyisophthalamide

To a 1 liter 3 necked flask equipped with a stirrer, nitrogen inlet, dropping funnel and condenser was added 13.3 g. (0.05 m.) of freshly distilled (120° C./0.5 mm.) 1,3,5-benzenetricarboxylic acid chloride and 100 ml. of benzene which had been dried by distillation from sodium. The 4-aminobenzil (22.5 g.-0.10 moles) was dissolved in 450 ml. of hot benzene was added dropwise to the acid chloride at reflux. The addition took 2 hours and HCl was evolved from the start of the addition. It required 2 additional hours at reflux to complete the reaction. The liberated HCl was passed into a water bath and this solution was continuously titrated with a standard sodium hydroxide solution. In this way it was possible to monitor the progress and the completion of the reaction. Finally 100 ml. of absolute ethanol (100%) was added to the reaction mixture which was heated at reflux for one hour. After cooling, the solid product was removed by filtration and dried in vacuum at 100° C. The product weighed 21 g. (64.5% yield) and had a melting point of 272-274° C.

ANALYSIS

| | C | H | N |
|---|---|---|---|
| Calculated | 71.77 | 4.32 | 4.29 |
| Found | 73.21 | 3.97 | 4.45 |

EXAMPLE 4

Polymerization 0.6526 g. (0.01 moles) of N,N'-bis(4-benzilyl)-5-carboethoxyisophthalamide and 0.2423 g. (0.001 moles) of 3,3',4,4'-benzophenone tetraamine were stirred under nitrogen in 10 ml. of N-methylpyrrolidone for a period of one hour. Then 5 ml. of m-cresol were added to catalyze the polymerization and after 21 hours of stirring at room temperature the solution becomes viscous and strong flexible films can be cast from the polymer solution.

EXAMPLE 5

N,N'-bis(4-benzilyl)-5-carbophenoxyisophthalamide

To a 1 liter 3 necked flask equipped with a stirrer, nitrogen inlet and condenser was added 53.1 g. (0.20 moles) of freshly distilled (120° C./0.5 mm.) 1,3,5-benzenetricarboxylic acid chloride and 90.12 g. (0.40 moles) of recrystallized (alcohol-water) 4-aminobenzil. Xylene (800 ml.) which had been dried by distillation from sodium was added to the contents of the flask which with stirring was then slowly raised to the reflux temperature. The liberated HCl was collected by passing the gas into a water bath where it dissolved and was titrated with a standard sodium hydroxide solution 95% of the theoretical amount of HCl was collected.

20.7 gm. (0.22 moles) of freshly distilled phenol (B.P. 182° C.) was added to the cool solution. The mixture was heated at reflux for 48 hours during which time 98% of the theoretical HCl was collected. On cooling, the solid product was collected by filtration and was washed by stirring several times in hot denatured alcohol. The product which was dried in vacuum at 100° C. weighed 84 gms. (60% yield) m.p. 278-280° C.

The other monomers and polymers of this invention can be prepared by using the above reaction procedures and merely substituting the appropriate starting materials.

Polymers wherein X is $$\overset{\text{C}}{\underset{\text{O}}{\|}},$$

Y is ortho, meta or para phenylene (especially p-phenylene) and R is phenyl, ethyl or hydrogen are preferred.

The molecular weight range of the useful polymers of this invention are those which can be formed into films or fibers. A good guide to the preferred polymers of this invention are those with an inherent viscosity of about 0.5 to about 2.5 dl./g. as 0.5 g. solution in 100 ml. of meta-cresol at about 30° C.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Compounds of the formula

⟨O⟩—C—C—Y—HNC—⟨benzene ring with C=O, OR substituent⟩—CNH—Y—C—C—⟨O⟩
      ‖ ‖         ‖                                ‖    ‖ ‖
      O O         O                                O    O O wherein R is selected from the group consisting of H, phenyl and lower alkyl and Y is selected from the group consisting of o-phenylene, m-phenylene, p-phenylene and

—⟨O⟩—Z—⟨O⟩— wherein Z is selected from the group consisting of a direct bond,

O, S, SO and SO$_2$.

2. The compound of claim 1 wherein Y is selected from the group consisting of o-phenylene, m-phenylene and p-phenylene.

3. The compound of claim 2 wherein Y is p-phenylene and R is H.

4. The compound of claim 2 wherein Y is p-phenylene and R is phenyl.

5. The compound of claim 2 wherein Y is p-phenylene and R is ethyl.

References Cited

UNITED STATES PATENTS 3,719,692  3/1973  Havinga et al. ----- 260—471 R

LORRAINE A. WEINBERGER, Primary Examiner

L. A. THAXTON, Assistant Examiner

U.S. Cl. X.R.

260—239.6, 470, 516, 518 R, 519